United States Patent Office 2,914,515
Patented Nov. 24, 1959

2,914,515

OLEFIN POLYMERIZATION PROCESS

Archibald P. Stuart, Media, Pa., assignor to Sun Oil Company, Philadelphia, Pa., a corporation of New Jersey No Drawing. Application January 22, 1958
Serial No. 710,414

11 Claims. (Cl. 260—88.2)

This invention relates to a new process for the preparation of relatively high molecular weight polymers, and more particularly relates to a process for the preparation of solid polymers of alpha-olefins having relatively uniform molecular weights.

Alpha-olefins such as propylene have heretofore been polymerized to high molecular weight solid polymers. A catalyst which is especially effective for the polymerization of alpha-olefins to such relatively high molecular weight solid polymers is the combination of a lower halide of titanium, such as titanium trichloride, and an aluminum trialkyl, such as aluminum triethyl. This catalyst can be prepared by admixing, for example, titanium tetrachloride with a reducing agent in an inert solvent such as isooctane. On admixing the two components, a finely divided solid phase is formed as a dispersion in the inert solvent. This dispersion, after the addition of an activator such as an aluminum alkyl, acts as a catalyst for polymerizing alpha-olefins to solid polymers. In performing the polymerization step, an alpha-olefin is contacted with the solid catalyst, such as by passing the olefin through a suspension of the finely divided solid in the inert, liquid reaction medium, and is thereby polymerized to solid polymers. Other materials can be substituted for the titanium trichloride and various activators can be used as hereinafter described.

After the polymerization reaction is complete, or has proceeded to a desired extent, the catalyst is removed from the polymer. A catalyst deactivating material such as water or an alcohol is added to the reaction mixture and the mixture is agitated preferably by means which comminute the polymer. Thereafter, in order to remove the inorganic catalyst or the inorganic particles from catalyst deactivation, the reaction mixture is contacted with a strong inorganic acid such as an aqueous or alcoholic solution of nitric acid. This contacting is performed at an elevated temperature using vigorous agitation means which may also comminute the polymer so that catalyst particles embedded therein are exposed to the action of the solution. If desired, the acid solution can be employed to both deactivate and dissolve the catalyst.

A major proportion of the products prepared as above described is insoluble in n-heptane boiling at atmospheric pressure, and is hereinafter referred to as heptane-insoluble polypropylene. Heptane-soluble polypropylene is also formed in the reaction, and is conveniently separated from the heptane-insoluble polymer by contacting with n-heptane boiling at atmospheric pressure. This separation is desirable since the heptane-insoluble polymer possesses especially desirable properties such as high melting point and high tensile strength which makes it suitable for many applications. However, in processes as heretofore performed, the heptane-insoluble polymers in the product vary substantially in molecular weight. For example, heptane-insoluble polymers having molecular weights of from 5,000 to 300,000 may appear in the same product although the general range appears to be from about 50,000 to 250,000. Under a given set of conditions it appears that a small amount, say below about 10% by weight of the polymer product, of very high molecular weight polymers is formed. For example, 20% of a polymer having an average molecular weight of 150,000 may be composed of polymers having an average molecular weight of 200,000, but of this 20% a small amount, say about 25% thereof (5% of the total polymer having a molecular weight of 150,000) may have an average molecular weight of 300,000 or more. This small quantity of relatively high molecular weight material is deleterious in that it increases the brittle point of the polymer product, decreases the tensile strength, and the like. However, no satisfactory means of operating the polymerization process to eliminate the formation of such small amounts of deleteriously high molecular weight polymers has been described, and no means of satisfactorily separating such high molecular weight products has been described.

An object of the present invention is to provide a process for the polymerization of alpha-olefins. A particular object is to provide a process for the polymerization of alpha-olefins in which the polymer products are free of polymers having relatively high molecular weights as compared to the average molecular weight of the polymer product. A further object is to provide a process for polymerizing olefins in which regulation of the molecular weight of the products is achieved. Other objects and their achievement in accordance with the process of the invention will be apparent hereinafter.

It has now been found that by adding a small amount of a hydrocarbon having an acidic hydrogen atom to an inert reaction medium containing dispersed particles of a solid subhalide polymerization catalyst, subsequently contacting the catalyst with an activator therefor, and using the resulting catalytic composition for polymerizing alpha-olefins, the polymer products produced are substantially free of relatively high molecular weight polymers, and that the average molecular weights of the polymers can be regulated to desired values.

Although alpha-olefins having from 2 to 8 carbon atoms per molecule such as ethylene, propylene, butene-1, isobutylene, butadiene-1,3, mixtures thereof and the like, can be polymerized in the present process and although the subhalides of several metals can be used as the solid polymerization catalyst, as herein described, for convenience the invention is described largely in terms of polymerizing propylene, using titanium trichloride as the catalyst.

In an embodiment of the process of the invention, titanium trichloride particles maintained as a slurry in isooctane is contacted with indene, the quantity of the indene being such that .01 mole thereof per mole of titanium trichloride is used. A quantity of aluminum triisobutyl such that the mole ratio thereof to titanium trichloride is 1 is then introduced into the isooctane. Propylene is contacted with the resulting slurry at a temperature of 80° C. and at a pressure of about 100 p.s.i.g. (pounds per square inch gauge) for 4 hours, during which time propylene is periodically introduced into the reactor to maintain the pressure at about the stated value. The polymer product is then separated from the reaction mixture as a white granular solid having an average molecular weight of 140,000 and having substantially no molecules having a weight above 180,000. The polypropylene produced in accordance with the process of the present invention is thus characterized by the absence of molecules having weights greatly in excess of the average molecular weight of the polypropylene.

While it is not known with certainty why the contacting of a small quantity of a hydrocarbon having an acidic hydrogen atom with the titanium trichloride produces a polymer product substantially free of polymers having relatively high molecular weights, it is believed that the hydrocarbon in some way reacts with what may be designated as "active centers" on the titanium trichloride, by which is meant small, very active portions of the titanium trichloride which cause the production of very high molecular weight polymers. It is apparent that only a minor portion of the titanium trichloride surface constitutes "active centers," since only a small quantity of acidic hydrogen containing hydrocarbon is necessary to prevent the formation of high molecular weight polymers.

Titanium trichloride is a preferred catalyst of the invention, but other halides of groups IV, V and VI of the periodic table can be employed. Preferably a halide of titanium, zirconium, hafnium, vanadium, niobium, chromium, molybdenum or tungsten is used. Although chlorides are the preferred halides, the bromide, fluoride and iodide analogues can be used. Iodides are especially useful when a diolefin such as butadiene is a component of the reaction mixture. The metal of the metal compound must be in a valence other than its highest valence state. The reduction of a metal compound such as titanium tetrachloride can be accomplished by any convenient means. For example, titanium tetrachloride dissolved in a saturated hydrocarbon, such as n-heptane or isooctane can be contacted with a dispersion of an alkali metal such as sodium, or it can be reduced by contacting with hydrogen or a metal alkyl such as aluminum trialkyl. However, when a metal alkyl is used as a reducing agent, any excess thereof must be removed prior to contacting the reduced halide with the acidic hydrogen containing hydrocarbon. It is necessary, however, that such a material be used as an activator and that the activator be added after contacting the subhalide with the acidic hydrogen containing hydrocarbon. Materials which can be used as the activator, in addition to aluminum trialkyls, include other metal alkyls, metal hydrides, metal borohydrides, and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenyl-isopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used include Grignard reagents such as methylmagnesium bromide, ethylmagnesium chloride, phenyl-magnesium bromide, and alkylhalogen compounds such as diethylaluminum chloride and the like.

As stated above, a hydrocarbon having an acidic hydrogen atom is contacted with a subhalide of a metal of groups IV, V or VI of the periodic table. By "hydrocarbon having an acidic hydrogen atom," as used herein, is meant a hydrocarbon which will decompose a Grignard reagent by the Zerewitinoff method. For example, a hydrocarbon having an acidic hydrogen atom will evolve methane from methyl magnesium chloride. Such hydrocarbons include indene, cyclopentadiene, fluorene, triphenyl methane, dihydroanthracene, and the like. The quantity of the hydrocarbon used must be within the range of from 0.005 to 0.15 mole per mole of titanium trichloride. A smaller quantity of the hydrocarbon does not prevent the formation of high molecular weight polymers and a larger quantity significantly decreases the catalytic activity of the titanium trichloride for the polymerization reaction. However, within the stated range of concentration, it appears that after the active centers on the subhalide catalyst have been obviated, any excess hydrocarbon in some way affects the catalyst so that the average molecular weight of the polymer product is decreased. Hence, the process of the invention can be used to regulate the molecular weights of the polymer products. When it is desired to merely eliminate the formation of the few relatively high molecular weight polymers normally produced, the quantity of the hydrocarbon used will be in the lower portion of the stated range, say from 0.005 to 0.01 mole per mole of titanium trichloride. When, in addition to eliminating the formation of such high molecular weight polymers, a decrease in the average molecular weight of the polymer products is desired, the quantity of the hydrocarbon will be in the upper portion of the stated range, say from 0.01 to 0.15 mole per mole of titanium trichloride. The exact amount preferably used in a given application is thus dependent upon the results desired and is readily determined.

As above stated, after contacting the titanium trichloride with an acid hydrogen containing hydrocarbon, a polymerization activator is incorporated into the dispersion. The mole ratio of titanium trichloride to activator should be within the range of from 1:10 to 10:1, and good results are obtained therewith. The total quantities of catalytic components used should be such that a light slurry of the solid phase is present in an inert, liquid reaction medium. Generally, the total of from 1 part of catalyst particles to from 30 to 10,000 or more parts of reaction medium give good results.

As above described, the catalyst is a finely divided solid maintained as a slurry, or a dispersion, in an inert, liquid reaction medium. Saturated hydrocarbons such as the hexanes, heptanes, octanes, decanes, cyclopentanes, cyclohexanes, mixtures thereof and the like which are liquid under the conditions of reaction are preferred materials to use as the reaction medium. Propylene is introduced into the catalyst slurry such as by bubbling propylene in gas phase into the slurry. If desired, the propylene can be dissolved in a hydrocarbon which is preferably the same as the reaction medium, and the resulting solution contacted with the catalyst slurry. The polymerization is performed under polymerizing conditions including a temperature within the range of from about 0° C. to 250° C. and a pressure of from atmospheric to about 5000 p.s.i.g. or more, it being necessary that the reaction medium be maintained in the liquid phase.

After the polymerization step, the polymer product is separated from at least a portion of the catalyst. This can be accomplished by adding a catalyst deactivating material to the reaction mixture, and dissolving the catalyst therein. If a relatively large quantity of inert reaction medium was used in the polymerizing step, it is advantageously separated from the polymer product such as by draining prior to introducing the catalyst deactivant. Water or a relatively low molecular weight alcohol such as methanol, ethanol, propanol, or isopropanol is a preferred catalyst deactivant. Contacting the polymer with the catalyst deactivant is preferably performed with agitation means which chop or comminute the polymer so that catalyst particles coated by or embedded in the polymer are exposed to the action of the deactivant. Methanol or an aqueous or alcoholic solution of nitric acid is then contacted with the polymer to dissolve residual solid catalyst components. If desired, methanol or such aqueous or alcoholic solution of nitric acid can be used to both deactivate and remove the catalyst. Heptane-soluble polymers are then preferably removed by contacting the polymer product with boiling n-heptane and separating the resulting solution.

The polymer products of the invention can vary in molecular weight from about 25,000 to 300,000 or more, and are characterized by absence of relatively high molecular weight polymers as compared to the average molecular weight. The polymer products melt in the range of from about 125° C. to 190° C., depending largely on the olefin or olefins polymerized and the degree of polymerization obtained. For example, with polypropylene, the molecular weight will generally be from about 50,000 to 250,000 and the melting point from about 161° C. to 171° C. These products are especially useful in applications where a low brittle point and high tensile strength is important. The polymers are useful as thin films for packaging materials, as conduits and containers for liquids, and the like. Such articles can be made by molding, extrusion, casting or the like.

The following examples illustrate the process of the invention in which "parts" refers to parts by weight unless otherwise indicated.

Particles of titanium trichloride are dispersed in a mixture of saturated aliphatic hydrocarbons having a predominant proportion of octanes. About 0.1 part of titanium trichloride for each 100 cc. of the saturated hydrocarbons is employed. Aluminum triethyl is introduced into the slurry so that the mole ratio thereof to the titanium trichloride is 0.6. The temperature of the resulting slurry is adjusted to about 90° C. and propylene is introduced into the reactor to a pressure of about 200 p.s.i.g., the quantity of propylene in the reaction medium being 50 mole percent. The temperature is maintained in the range of 85° C. to 95° C. and the pressure at substantially 200 p.s.i.g., by periodically adding propylene for 0.5 hour.

Methanol is introduced into the reactor to deactivate the catalyst and the catalyst is thereafter extracted with an alcoholic solution of nitric acid. After separation and drying, and removing heptane-soluble polymers by dissolution in hot n-heptane, a white polymer product having an average molecular weight of 160,000 is recovered. The polymer has a melting point of about 168° C.

On repeating the above procedure, except that prior to the introduction of aluminum alkyl into the reactor, the titanium trichloride slurry is contacted with indene, the quantity of indene being such that the mole ratio thereof to titanium trichloride is 0.06, the polypropylene product has substantially the same molecular weight, but the transparency of thin molded articles is considerably improved by the elimination of small opaque portions observed in molded articles prepared from the polymer as above described, which are apparently due to the presence of small amounts of very high molecular weight polymers.

On repeating the procedure using indene, except that the quantity of the indene is increased so that the mole ratio thereof to titanium trichloride is 0.15, the molecular weight of the polypropylene product is reduced to about 110,000.

The invention claimed is:
1. Process for the polymerization of alpha-olefins which comprises contacting, under polymerizing conditions, an alpha-olefin having from 2 to 8 carbon atoms per molecule with a polymerization reaction mixture prepared by admixing a hydrocarbon having an acidic hydrogen atom with a dispersion in an inert liquid hydrocarbon reaction medium of solid particles of a subhalide of a metal of groups IV, V and VI of the periodic table, the amount of said hydrocarbon having an acidic hydrogen atom being from 0.005 to 0.15 mole per mole of the metal subhalide, and thereafter adding a polymerization activator selected from the group consisting of metal alkyls and metal hydrides to the dispersion to form said polymerization reaction mixture.

2. Process for the polymerization of alpha-olefins having from 2 to 8 carbon atoms per molecule which comprises dispersing, in an inert hydrocarbon liquid reaction medium, particles of a subhalide of a metal selected from the group consisting of groups IV, V and VI of the periodic table with a hydrocarbon having an acidic hydrogen atom, the amount of said hydrocarbon having an acidic hydrogen atom being from 0.005 to 0.15 mole per mole of the metal subhalide, subsequently contacting the resulting slurry with a metal alkyl polymerization activator and thereafter contacting, under polymerizing conditions, an alpha-olefin having from 2 to 8 carbon atoms with the resulting slurry.

3. Process according to claim 2 wherein the alpha-olefin is ethylene.

4. Process according to claim 2 wherein the alpha-olefin is propylene.

5. Process according to claim 2 wherein the alpha-olefin is a mixture of ethylene and propylene.

6. Process for producing polypropylene characterized by the absence of polymers having molecular weights greatly in excess of the average molecular weight of the polypropylene which comprises, dispersing particles of titanium trichloride in an inert, liquid hydrocarbon reaction medium, introducing a hydrocarbon having an acidic hydrogen atom into the resulting slurry in a quantity such that the mole ratio thereof to titanium trichloride is from 0.005 to 0.15, subsequently introducing a metal alkyl polymerization activator into the dispersion, contacting, under polymerizing conditions, propylene with the resulting dispersion and recovering solid polypropylene characterized by the absence of relatively high molecular weight polymers from the reaction medium.

7. Process according to claim 6 wherein said hydrocarbon having an acidic hydrogen atom is cyclopentadiene.

8. Process according to claim 6 wherein said hydrocarbon having an acidic hydrogen atom is fluorene.

9. Process according to claim 6 wherein said hydrocarbon having an acidic hydrogen atom is indene.

10. Process according to claim 6 wherein said hydrocarbon having an acidic hydrogen atom is triphenylmethane.

11. Process according to claim 6 wherein the polymerization activator is aluminum triethyl.

References Cited in the file of this patent
UNITED STATES PATENTS

| 2,827,446 | Breslow | Mar. 18, 1958 |
| 2,843,577 | Friedlander et al. | July 15, 1958 |

OTHER REFERENCES

Kharasch et al.: Grignard Reaction of Non Metallic Substances (1954), pages 1169–71.

Natta et al.: La Chimica E L'Industria, vol. 38, No. 2, pages 124–27, February 1956.

Birmingham et al.: J. Am. Chem. Soc., vol. 76, page 4179 (1954).